US009951747B2

(12) United States Patent
Prins

(10) Patent No.: US 9,951,747 B2
(45) Date of Patent: Apr. 24, 2018

(54) METHOD AND SYSTEM FOR EXTRACTING KINETIC ENERGY FROM SURFACE WAVES OF A WATER

(71) Applicants: RIJKSUNIVERSITEIT GRONINGEN, Groningen (NL); Wouter Adrianus Prins, Leeuwarden (NL)

(72) Inventor: Wouter Adrianus Prins, Leeuwarden (NL)

(73) Assignees: RIJKSUNIVERSITEIT GRONINGEN, Groningen (NL), part interest; Wouter Adrianus Prins, Leeuwarden (NL), part interest ( * ) Notice: Subject to any disclaimer, the term of this patent is extended or adjusted under 35 U.S.C. 154(b) by 100 days.

(21) Appl. No.: 15/027,944

(22) PCT Filed: Oct. 10, 2013

(86) PCT No.: PCT/NL2013/050721
§ 371 (c)(1),
(2) Date: Apr. 7, 2016

(87) PCT Pub. No.: WO2015/053615
PCT Pub. Date: Apr. 16, 2015

(65) Prior Publication Data
US 2016/0237980 A1    Aug. 18, 2016

(51) Int. Cl.
*F03B 13/18* (2006.01)
*F03B 15/02* (2006.01)
*F03B 13/20* (2006.01)

(52) U.S. Cl.
CPC ............ *F03B 13/187* (2013.01); *F03B 13/20* (2013.01); *F03B 15/02* (2013.01); *F05B 2270/20* (2013.01); *F05B 2270/30* (2013.01); *Y02E 10/38* (2013.01)

(58) Field of Classification Search
CPC ........ F03B 13/187; F03B 15/02; F03B 13/20; Y02E 10/38; F05B 2270/20; F05B 2270/30
(Continued)

(56) References Cited

U.S. PATENT DOCUMENTS 4,398,095 A    8/1983  Ono
6,812,588 B1 *  11/2004  Zadig ................... F03B 13/187
290/53
(Continued)

FOREIGN PATENT DOCUMENTS

EP    2128430 A1    12/2009
GB    2084259 A     4/1982
(Continued)

*Primary Examiner* — Hoang Nguyen
(74) *Attorney, Agent, or Firm* — Pearne & Gordon LLP

(57) ABSTRACT

The invention relates to extracting kinetic energy from surface waves. Therein, at least one float (8) is kept floating in the area of the surface waves, while a working fluid is held in a reservoir structure (2, 3). The float is connected to a fluid displacement structure in such manner that an individual surface wave, which causes an upward stroke of the float, moves the working fluid within the reservoir structure in such manner that the potential energy of the working fluid is increased. Before the wave has reached the float, the wave is detected by a sensor (7). Based on said detection, a prediction is calculated of the amount of kinetic energy available in the wave. Tuned to said prediction, an energy transmission structure of the fluid displacement structure is adjusted for realizing the energy conversion.

28 Claims, 10 Drawing Sheets

(58) Field of Classification Search
USPC ..... 60/497–500, 502–503, 505–506; 290/42, 290/53
See application file for complete search history.

(56) References Cited

U.S. PATENT DOCUMENTS

| | | |
|---|---|---|
| 8,366,410 B2 | 2/2013 | Sieber et al. |
| 2004/0056779 A1* | 3/2004 | Rast ................. B63B 22/16 340/985 |
| 2007/0102937 A1* | 5/2007 | Resen Steenstrup ... F03B 11/06 290/53 |
| 2009/0284014 A1 | 11/2009 | Sieber et al. |
| 2012/0096846 A1 | 4/2012 | Kalinin |
| 2013/0008164 A1 | 1/2013 | Cunningham et al. |

FOREIGN PATENT DOCUMENTS

| | | |
|---|---|---|
| WO | 2009153329 A2 | 12/2009 |
| WO | 2011162817 A1 | 12/2011 |

\* cited by examiner

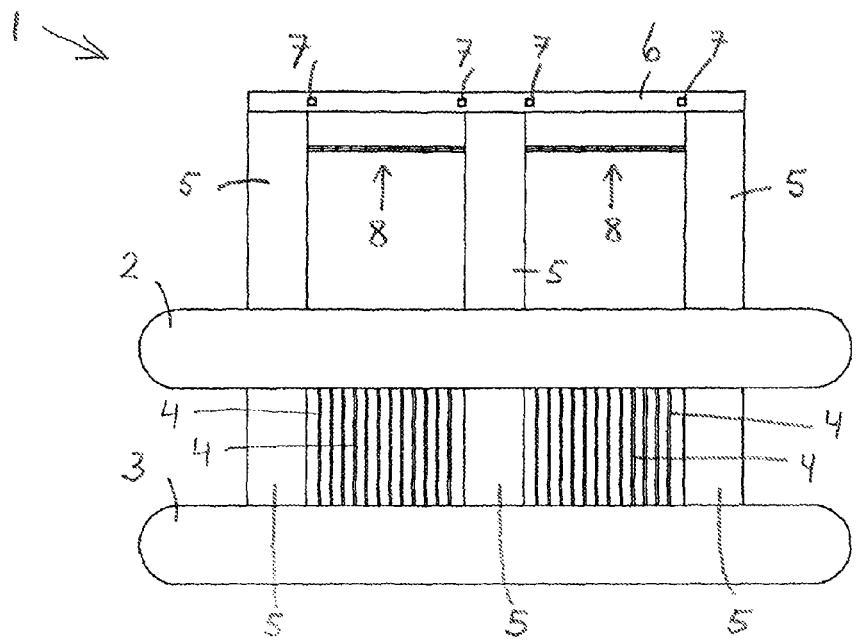
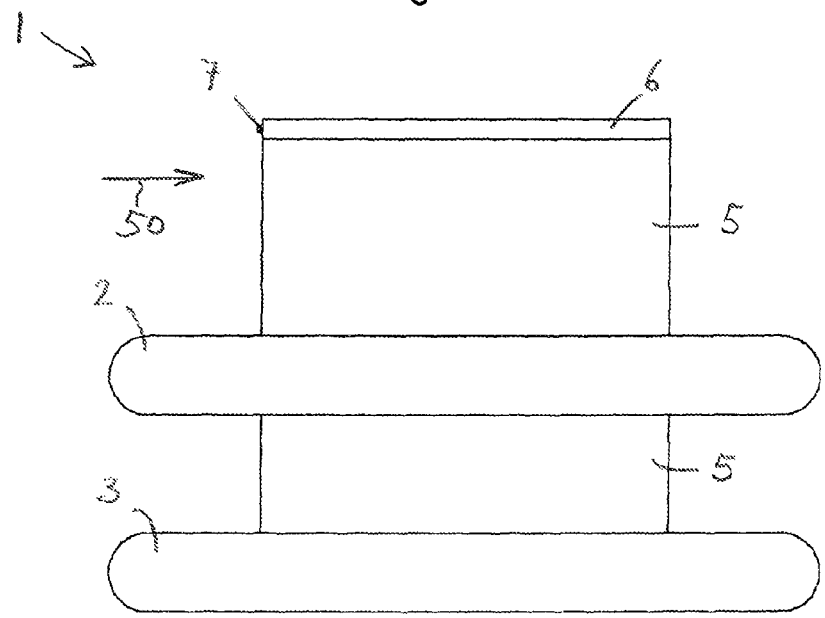

METHOD AND SYSTEM FOR EXTRACTING KINETIC ENERGY FROM SURFACE WAVES OF A WATER

The invention relates to a method and a system for extracting kinetic energy from surface waves of a water, said waves moving in a horizontal wave movement direction along the water surface of the water.

In the present context it is noted that the term "water" in the expression "surface waves of a water", as used hereinabove and as used in similar expressions throughout the present document, refers to a sea, an ocean, a waterway, or other similarly large water basin.

Furthermore, it is noted that each of the expressions "surface wave(s) of a water", "wave of a water", "surface wave", "water wave", or simply the short term "wave", as used hereinabove and as used throughout the present document, refers to the well-known elongated waves of a water, mostly caused by wind. The longitudinal direction of such an elongated surface wave is most clearly seen in a view from above onto the water surface. Such a wave is moving along said water surface in a direction transverse to the wave's longitudinal direction. As seen in vertical cross section transverse to the longitudinal direction of such a surface wave, the upper surface of the wave has the shape of a substantially convex elevation of the water surface of the water.

It is furthermore noted that in the present document an "individual" (surface) wave (of a water) refers to only those parts of the surface wave which are lying vertically beneath the substantially convexly elevated wave's upper surface, mentioned above. This way, an "individual" (surface) wave is understood to be bordered by two wave troughs and to have only one crest in-between these two troughs.

Furthermore, when referring in the present document to the expression "(horizontal) wave movement direction" of a wave, it is meant to indicate the moving direction of the abovementioned substantially convexly elevated wave's upper surface shape along the water surface of the water, which moving direction is a horizontal direction transverse to the abovementioned longitudinal direction of the wave.

A problem in the kinetic energy extraction from water waves is that wave conditions generally are highly variable. During calm sea conditions the kinetic energy of the water waves generally is lower than during heavy sea conditions, while sea conditions may change rapidly. Furthermore, even in a certain, rather stable sea condition, individual waves are still very different from one another as regards to aspects like their wavelenghts and their wave amplitudes and, therefore, as regards to their kinetic energy. Generally, a technique tailored for efficiently extracting kinetic energy from one individual wave with relatively high kinetic energy will be a less efficient technique for extracting kinetic energy from another individual wave with relatively low kinetic energy. Similarly, a technique tailored for efficiently extracting kinetic energy from one individual wave with relatively low kinetic energy will be a less efficient technique for extracting kinetic energy from another individual wave with relatively high kinetic energy.

It is an object of the invention to provide a solution according to which kinetic energy is extracted from surface waves of a water, while providing that high efficiency of said energy extraction is automatically maintained in a continuous manner throughout highly varying wave conditions as they usually occur.

For that purpose, the invention provides a method for extracting kinetic energy from surface waves of a water, said waves moving in a horizontal wave movement direction along the water surface of the water, wherein:

- at least one float is kept floating in the area of the surface waves, with partly restricted freedom of floating movements of the float, such that the float is moved by the surface waves at least in reciprocating upward and downward strokes of the float;
- a working fluid is held in a reservoir structure;
- the float is connected to a fluid displacement structure in such manner that for at least one individual surface wave of said surface waves the corresponding upward stroke of the float, which corresponding upward stroke is caused by said individual surface wave having reached the float, moves, via the fluid displacement structure, the working fluid within the reservoir structure in such manner that the potential energy of the working fluid increases, whereby, accordingly, via the float and via the fluid displacement structure, kinetic energy is extracted from said individual surface wave and converted into increased potential energy of the working fluid;
- with the aid of at least one sensor said individual surface wave is detected before said individual surface wave has reached the float;
- with the aid of at least one calculator, and based on said detection, there is calculated a prediction being indicative of the amount of kinetic energy available in said individual surface wave for realizing said conversion into increased potential energy of the working fluid during said corresponding upward stroke of the float; and
- with the aid of at least one controller, and tuned to said calculated prediction being indicative of the amount of the kinetic energy available in said individual surface wave, an energy transmission structure of the fluid displacement structure is adjusted for realizing said conversion into increased potential energy of the working fluid during said corresponding upward stroke of the float.

The invention is elucidated as follows.

Thanks to said at least one sensor and said at least one calculator, a prediction, indicative of the amount of kinetic energy of an individual surface wave, is available already before said individual surface wave has reached the float. Said prediction is obtainable from several sensed characteristics of said individual surface wave, including the sensed "height" of the individual wave (vertical crest-to-trough distance of the wave), the sensed "width" of the individual wave (horizontal distance between the two bordering troughs of the wave), and the sensed velocity of the individual wave in the wave movement direction.

As stated, according to the invention an individual surface wave has a corresponding upward stroke of the float, in the sense that said extraction and said conversion of the kinetic energy of said individual surface wave takes place during said corresponding upward stroke of the float. Thanks to said at least one controller, the energy transmission structure of the fluid displacement structure is automatically tailored to the amount of the kinetic energy available in said individual surface wave, for realizing said conversion into increased potential energy of the working fluid during said corresponding upward stroke of the float. This means that, if said individual surface wave has relatively high kinetic energy, the displacement structure will automatically be adjusted for moving the working fluid efficiently, taking account of the relatively high increase in potential energy that the working fluid is enabled to gain from the relatively high available kinetic energy. And if, on the other hand, said individual surface wave has relatively low kinetic energy, the displacement structure will automatically be adjusted for moving the working fluid efficiently, taking account of the relatively low increase in potential energy that the working fluid is enabled to gain from the relatively low available kinetic energy.

It is noted that the increased potential energy of the working fluid, obtained from extracting kinetic energy from the surface waves, may be further processed in various ways. Said increased potential energy of the working fluid may for example be converted into electrical energy, which can easily be stored and distributed.

It is furthermore noted that various working fluids may be used in connection with the present invention, including various liquids and various gasses. In case of a liquid working fluid, the increase of potential energy of the liquid may e.g. be realized by moving the liquid upwards. In case of a gaseous working fluid, the increase of potential energy of the gas may e.g. be realized by compressing the gas.

In a preferable embodiment of a method according to the invention, said adjusting of said energy transmission structure of said fluid displacement structure for realizing said conversion into increased potential energy of the working fluid during said corresponding upward stroke of the float at least partly takes place during a downward stroke of the float, which downward stroke, in the sense of said reciprocating upward and downward strokes of the float, directly precedes said corresponding upward stroke of the float. This provides an efficient time management of the method. After all, the time spent for performing the directly preceding downward stroke caused by a directly preceding individual surface wave is idle time in the sense that during this time the float is not substantially extracting kinetic energy. Hence, according to this preferable embodiment, this idle time is made very useful for already adjusting the energy transmission structure tailored to the amount of kinetic energy available in an individual surface wave that directly follows said directly preceding individual surface wave.

In another preferable embodiment of a method according to the invention, which can be applied in combination with any one of the aforementioned preferable embodiments of the invention, said adjusting of said energy transmission structure of said fluid displacement structure comprises adjustment of a contact surface configuration of said energy transmission structure, which contact surface configuration contactingly acts upon the working fluid in said reservoir structure. Said adjustment of the contact surface configuration may include adjustment of the contact surface configuration's surface area via which the contacting action upon the working fluid takes place. Additionally or alternatively, said adjustment of contact surface configuration may also include adjustment of the contact surface configuration's shape. Such adjustments of the contact surface configuration are very effective in tailoring the energy transmission structure to the amount of available kinetic energy which has to be converted for a certain individual surface wave. Therefore, such adjustments of the contact surface configuration are very effective in continuously providing high efficiency in the kinetic energy extraction from surface waves throughout varying wave conditions as they occur.

In another preferable embodiment of a method according to the invention, which can be applied in combination with any one of the aforementioned preferable embodiments of the invention, said adjusting of said energy transmission structure of said fluid displacement structure comprises gear adjustment of a gear structure of said energy transmission structure. Said gear adjustment not only is very effective, but also provides high flexibility in tailoring the energy transmission structure to the amount of available kinetic energy which has to be converted for a certain individual surface wave. Said gear adjustment allows for efficient energy extraction for a very wide range of individual surface waves in terms of their kinetic energy contents. It not only enables high efficiency in extracting energy from an extremely high energy containing surface wave, but also high efficiency in extracting energy from an extremely low energy containing surface wave. In addition, said gear adjustment can be realized with relatively compact gear structure.

In another preferable embodiment of a method according to the invention, which can be applied in combination with any one of the aforementioned preferable embodiments of the invention:

the at least one float comprises at least one further such a float, said further float having its own corresponding further such reciprocating upward and downward strokes and being connected in the said manner to a further such fluid displacement structure having a further such energy transmission structure, wherein the float together with said at least one further float are situated downstream of one another in a float-after-float fashion, thus forming a float-after-float assembly, wherein the term "downstream" is interpreted in the sense of said horizontal wave movement direction of said individual surface wave;

with the aid of said at least one sensor said individual surface wave is detected before said individual surface wave has reached said further float;

with the aid of said at least one calculator, and based on said detection before said individual surface wave has reached said further float, there is calculated a further prediction being indicative of the amount of kinetic energy available in said individual surface wave for realizing said conversion into increased potential energy of the working fluid during said corresponding further upward stroke of the further float; and with the aid of said at least one controller, and tuned to said calculated further prediction being indicative of the amount of the kinetic energy available in said individual surface wave, said further energy transmission structure of said further fluid displacement structure is adjusted for realizing said conversion into increased potential energy of the working fluid during said corresponding further upward stroke of the further float.

This last mentioned preferable embodiment of the invention provides the advantage that kinetic energy can be extracted from an individual surface wave in a multi-phase manner. That is, after a portion of kinetic energy has been extracted from the individual surface wave by means of the float, a further portion of kinetic energy will be extracted from the same individual surface wave by means of the further float, which is located downstream of the float. Similarly, after said further portion of kinetic energy has been extracted from the same individual surface wave by means of the further float, a yet further portion of kinetic energy can be extracted from the same individual surface wave by means of a yet further float, which is located downstream of the further float. This process can be continued similarly for yet further and further (downstream) floats of said float-after-float assembly.

It is noted that with the aid of said at least one sensor, said at least one calculator, and said at least one controller various methods are possible for adjusting said further energy transmission structure of said further fluid displacement structure. For example, it is possible to detect said individual surface wave for the purpose of adjusting said further energy transmission structure, which corresponds to the further float, at a somewhat later time and other location, as compared to the time and location where said individual surface wave is detected for the purpose of adjusting the energy transmission structure, which corresponds to the (upstream) float. This way, detection results will be obtained taking account of actual kinetic energy loss of the wave due to already performed energy extraction by the (upstream) float, or by further upstream floats. Additionally or alternatively, it is also possible to calculate said further prediction based on estimates and/or measurements of one or more earlier performed energy extractions and/or energy conversions caused by one or more upstream floats.

In another preferable embodiment of a method according to the invention, downstreamly adjoining floats of said float-after-float assembly are hingeably interconnected. Such kind of interconnections between downstreamly adjoining floats reduces friction losses between the water and the totality of the floats of the float-after-float assembly, especially the friction losses caused by friction force components in the horizontal wave movement direction. Such kind of interconnections furthermore promote an even load distribution over the respective fluid displacement structures of the respective floats of the float-after-float assembly.

In another preferable embodiment of a method according to the invention, which can be applied in combination with any one of the aforementioned preferable embodiments of the invention:

the working fluid is a working liquid;
the reservoir structure comprises an upper reservoir, a lower reservoir and a first liquid guiding structure, the upper reservoir being located in the water at least partly below the water surface of the water and at least partly below the at least one float, the lower reservoir being located in the water at least partly below the water surface of the water and at least partly below the upper reservoir, and the first liquid guiding structure interconnecting the upper reservoir and the lower reservoir; and
the fluid displacement structure comprises a hoist structure and a one-way valve structure;
and the method further comprises:
moving at least part of the working liquid successively out of the lower reservoir, through the first liquid guiding structure, and into the upper reservoir during said corresponding upward stroke of the float, said moving being performed against the action of gravity and under the action of said hoist structure being actuated by the float performing said corresponding upward stroke; and
preventing that during a next corresponding downward stroke of the float, which next corresponding downward stroke of the float, in the sense of said reciprocating upward and downward strokes of the float, directly follows said corresponding upward stroke of the float, at least part of the working liquid under the action of gravity flows back from the upper reservoir, through the first liquid guiding structure, and into the lower reservoir, said preventing being provided by a condition of said one-way valve structure.

Using a liquid, such as e.g. water, as the working fluid matches very well with the medium (i.e. the water of the surface waves) from which the kinetic energy is to be extracted. This allows for an efficient energy conversion (from water to liquid, more specifically e.g. from water to water) by using the recited components of the reservoir structure and fluid displacement structure.

In another preferable embodiment of a method according to the invention:

the reservoir structure comprises a second liquid guiding structure, which interconnects the upper reservoir and the lower reservoir;
and the method further comprises:
allowing the working liquid to successively flow, under the action of gravity, out of the upper reservoir, through the second liquid guiding structure, and into the lower reservoir, while generating electrical energy from said flow via at least one turbine.

This provides the advantage that the working liquid, having flown back to the lower reservoir, can be re-used again and again for being moved into the upper reservoir under the action of the hoist structure being actuated by the float.

The invention is furthermore embodied in a system according to claim 9. Specific embodiments of a system according to the invention are set forth in dependent claims 9-16.

These and other aspects of the invention will be apparent from and elucidated with reference to the embodiments described hereinafter by way of non-limiting examples only and with reference to the schematic figures in the enclosed drawing.

FIG. 1B shows the example of FIG. 1A in a front view.

FIG. 1C shows the example of FIG. 1A in a side view.

Figure 1A:
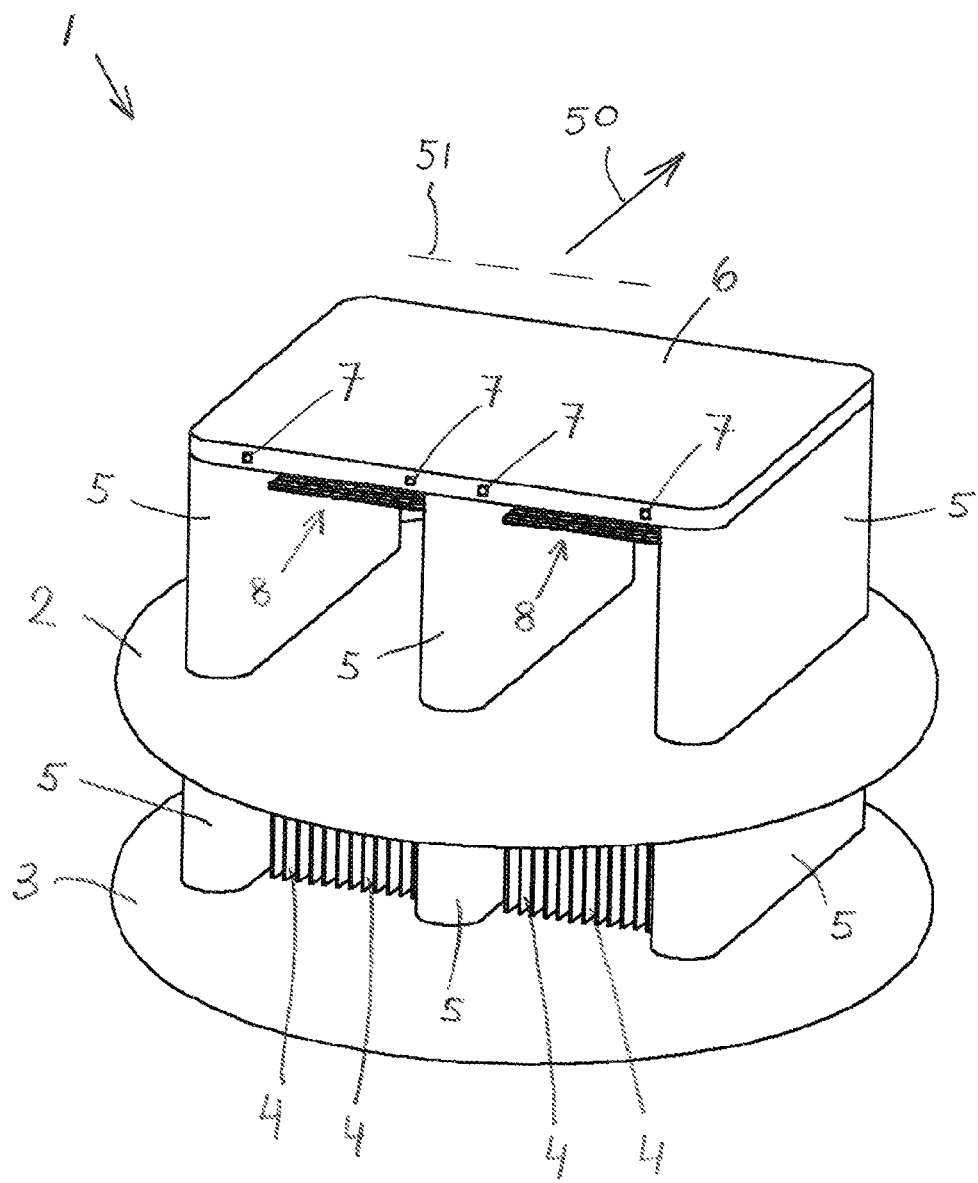
FIG. 1A shows, in a perspective view, an example of an embodiment of a system according to the invention.

Reference is first made to FIGS. 1A, 1B and 1C, which show a system 1 according to the invention. The system 1 is a large structure, which in operation is floating in a water, more in particular in a region of the water (e.g. an ocean or sea) where sufficiently interesting surface waves are occurring all or most of the time. For simplicity, the water hereinafter is referred to as "the sea". System 1 has a reservoir structure, which comprises an upper reservoir 2 and a lower reservoir 3, whose global shapes are more or less horizontally plane. Above the upper reservoir, the system 1 also has a more or less plane horizontal top structure 6. The system 1 furthermore has a number of vertical interconnection walls 5, some of them interconnecting the lower reservoir 3 and the upper reservoir 2, other of them interconnecting the upper reservoir 2 and the top structure 6.

The system 1 further comprises two assemblies 8 of floats 9. These float assemblies 8 are located in-between the upper reservoir 2 and the top structure 6. Also, each float assembly 8 is located between two of the interconnection walls 5. For clarity such a float assembly 8 is shown separately in FIG. 2.

In operation, most parts of the system 1, i.e. at least the upper reservoir 2 and the lower reservoir 3, are submerged. However, in operation the top structure 6 is substantially situated above the water surface, while the float assemblies 8 are kept floating near the water surface. Under the influence of surface waves, the float assemblies 8 are moveable relative to the system's main structure, i.e. they are moveable relative to the upper and lower reservoirs 2, 3, the top structure 6, and the interconnecting walls 5.

In FIGS. 1A and 1C the arrow 50 indicates the rough/average horizontal wave movement direction of the surface waves occurring at the location where the system 1 is situated. From these Figures it is seen that this (horizontal) wave movement direction 50 is parallel to the planes of the interconnection walls 5. In fact, in the present example, it is assumed that the system 1 has been oriented in such manner that the interconnection walls 5 are parallel to the wave movement direction 50, which is the predominantly occurring direction of the wave movements at the region of the sea where the system 1 has been installed. It is noted that the system may for example be arranged in a steerable manner relative to the sea bottom, so that the system can always be re-oriented for achieving the abovementioned parallel relationship between (predominant) wave movement direction 50 and interconnecting walls 5. Such a steerability of the system may be realized in various ways, for example by using (steerable) propellers/thrusters.

Figure 2:
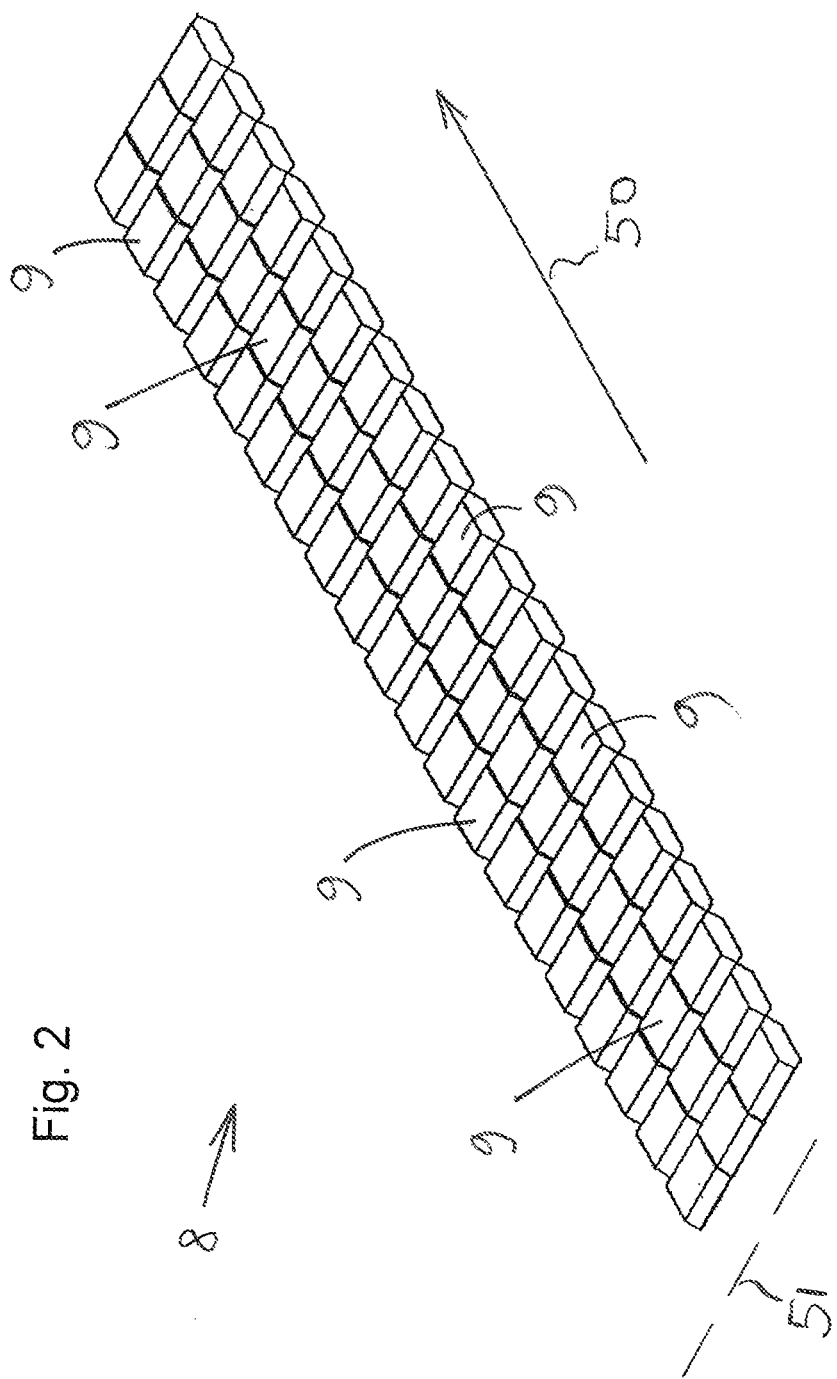
FIG. 2 shows, in a perspective view and in part, an example of an embodiment of an assembly of floats used in the system of FIG. 1A.

Said wave movement direction 50 has also been indicated in FIG. 2. It is seen that the float assembly 8 comprises individual floats 9 which are situated downstream of one another in a float-after-float fashion (in the sense of the horizontal wave movement direction 50). Note that FIG. 2 shows three rows of floats 9 of the float-after-float assembly 8, each row having twenty floats 9 situated downstream of one another. In fact, the assembly 8 has more than 3 suchs rows (the other rows have been omitted from FIG. 2 for reasons of simplicity). FIG. 2 (and also FIG. 1A) furthermore shows the line 51, which is a horizontal line being perpendicular to the wave movement direction 50. Hence, the line 51 is parallel to the rough/average of the longitudinal directions of the surface waves occurring at the location where the system 1 is situated. This implies that one can consider that, roughly and in average, the front lines of the wavefronts of the surface waves which are incident on the system 1 are parallel to the line 51 and are moving in the direction 50. It is noted that the downstreamly adjoining floats 9 of the assembly 8 (see FIG. 2) are hingeably interconnected, wherein the hinging lines are parallel to the line 51. By means of these hinging connections, the shape of the assembly 8 is able to substantially follow the (substantially convex elevation) shape of a surface wave. In the shown example, the sidewardly adjoining floats 9 of the assembly 8 (i.e. floats of different rows, which floats are adjoining in the direction 51) are interconnected by means of stretchy/elastic/flexible interconnections, thereby providing sidewards float interconnetions which allow for high degrees of mutual movements of the floats.

FIGS. 1A, 1B and 1C furthermore show a number of sensors 7, which are configured, arranged and effective to detect individual surface waves before they have reached the float assemblies 8. Said sensors 7 may be configured, arranged and effective to sense one or more of various characteristics of said individual surface waves, including the "height" of an individual wave (vertical crest-to-trough distance of the wave), the "width" of an individual wave (horizontal distance between the two bordering troughs of the wave), and the velocity of an individual wave in the wave movement direction 50. It is also noted that many types and places of such kind of sensors are possible. The sensors may for example be based on radar detection, camera detection, digital imaging, etc., and may, e.g., also be located on and/or integrated with floating buoys, which are located upstream of the float assemblies 8.

FIGS. 1A and 1B furthermore show a number of vertical walls 4, which are interconnecting the lower reservoir 3 and the upper reservoir 2. In the shown example, each of the float rows of the float assemblies 8 (see FIG. 2) has a corresponding vertical wall 4. The configurations and functions of these vertical walls 4 are elucidated with reference to FIG. 4, which is a vertical cross-sectional view of system 1 through, and parallel to, one of the walls 4. Each wall 4 does not only interconnect the lower reservoir 3 and the upper reservoir 2, but also extends into the interiors of the lower reservoir 3 and the upper reservoir 2. Each wall has a hollow interior and, via that hollow interior, allows for fluid communication between the lower reservoir 3 and the upper reservoir 2. In fact, the hollow interior provides the abovementioned first liquid guiding structure, which in FIG. 4 has been indicated by reference numeral 52.

Figure 3:
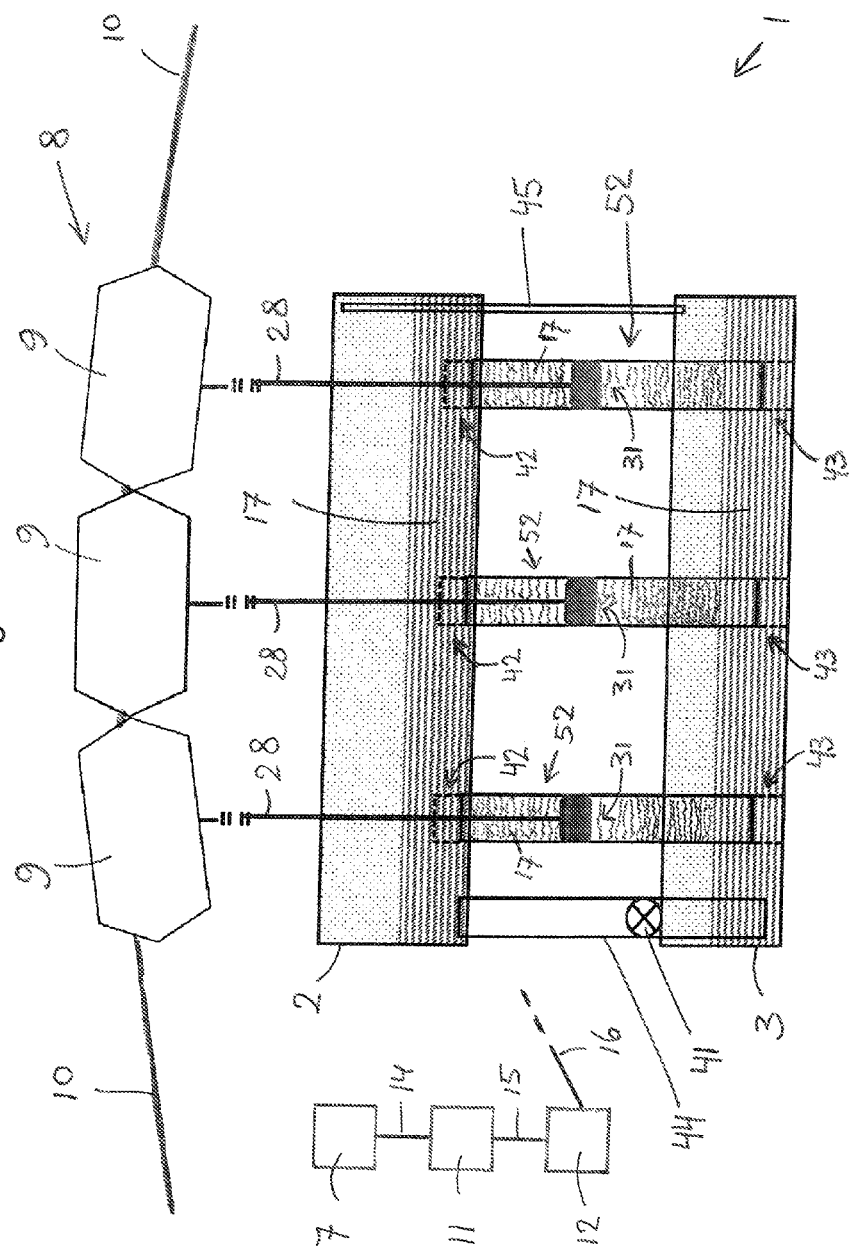
FIG. 3 shows, in a highly schematical way, a vertical cross-section through the system of FIG. 1A, as well as some further parts of said system.
Figure 4:
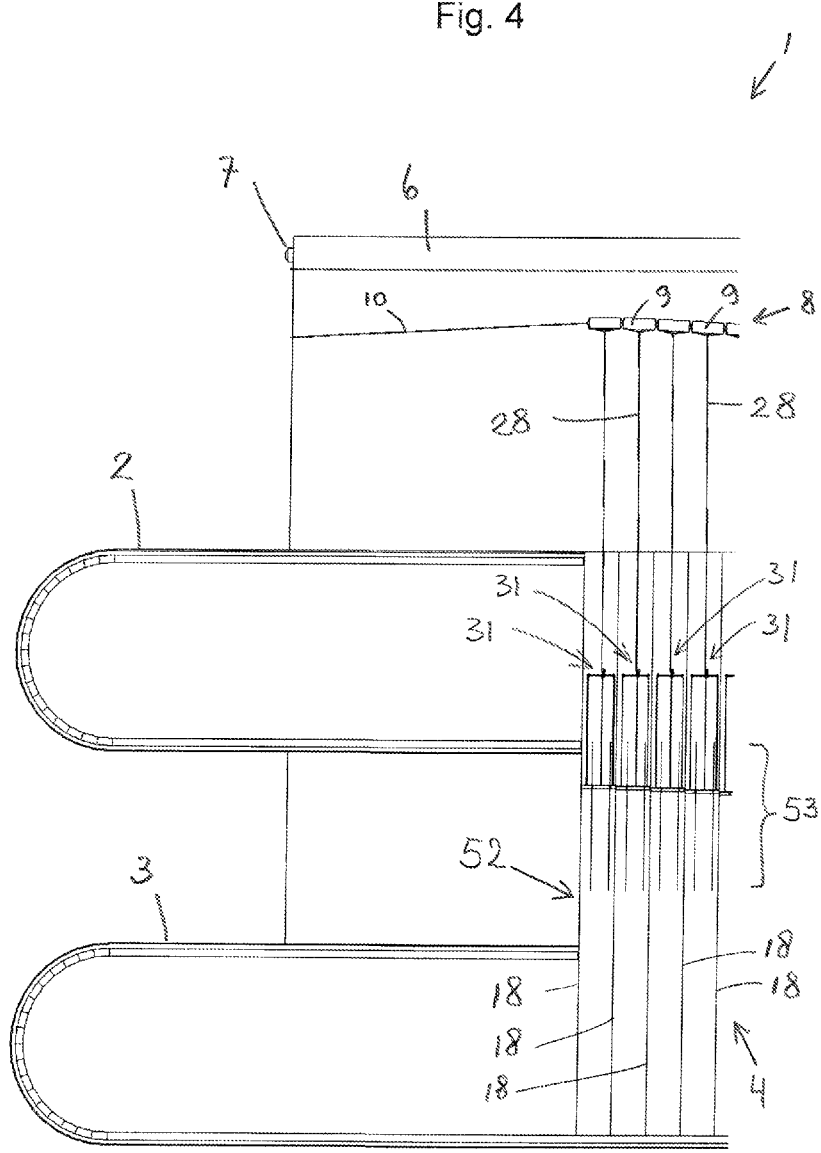
FIG. 4 shows, in a vertical cross-sectional view, part of the system of FIG. 1A in more detail.

Reference is now made to FIG. 3, which shows, in a highly schematical way, a vertical cross-section similar to the vertical cross-section of FIG. 4. FIG. 3 also shows, in a highly schematical way, some other parts of the system 1, such as sensor 7, calculator 11, controller 12, second liquid guiding structure 44 with turbine 41, and fluid conduit 45. These other parts are not (necessarily) present in the vertical cross-section of FIG. 3.

In FIG. 3, the darker, lower areas of the lower reservoir 3 and of the upper reservoir 2 are indicated with reference numeral 17, which in the present example of the invention, functions as the abovementioned working liquid, e.g. water. The lighter, higher areas of the lower reservoir 3 and of the upper reservoir 2 represent air, being contained in these reservoirs. It is seen in FIG. 3 that the working liquid 17 is also present in the first liquid guiding structure 52.

In FIG. 3, the reference numeral 10 indicates part of an individual surface wave. FIG. 3 also shows three adjacent floats 9 of a float row of the float assembly 8. Each of these three floats 9 is connected to a fluid displacement structure, which comprises a flexible hoist line 28 (steel cable, or the like), further structure, generally indicated by reference numeral 31, and one-way valve structure 42, 43. It is noted that also said further structure 31 contains one-way valve structure, which will be discussed later on. All these one-way valve structures allow the working liquid 17 to flow along a fluid path extending from the lower reservoir 3, via the first liquid guiding structure 52, and into the upper reservoir 2, while preventing the working liquid 17 to flow back in reverse direction.

Figure 7A:
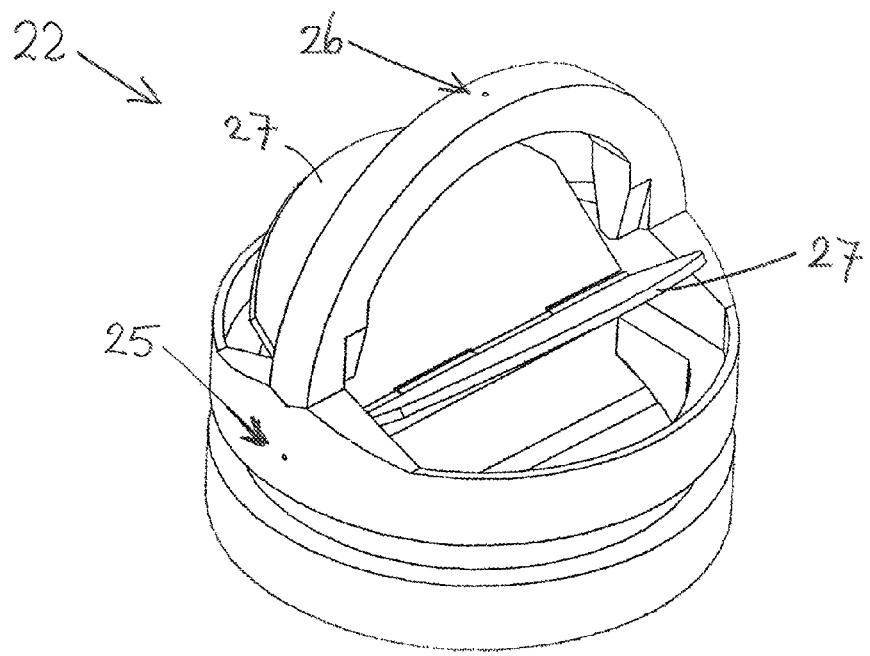
FIG. 7A shows, in a perspective view, an example of an embodiment of a fluid displacer used in the system of FIG. 1A, said fluid displacer comprising a one-way valve.
Figure 7B:
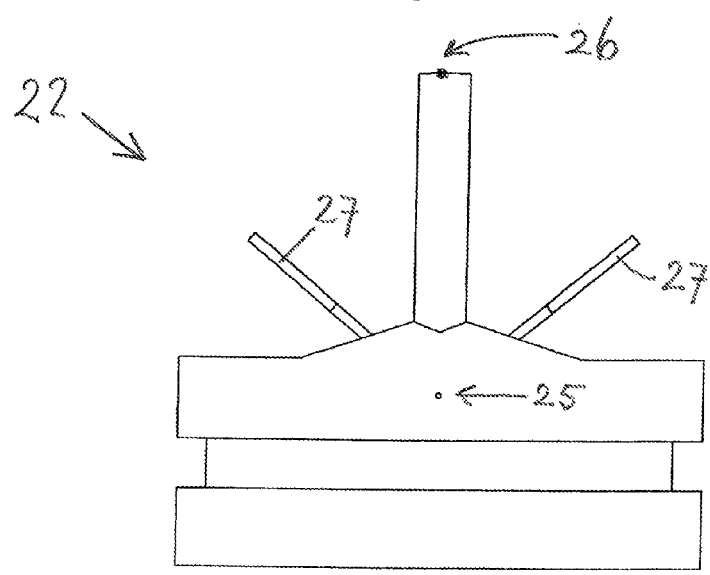
FIG. 7B shows the example of FIG. 7A in a side view.
Figure 8:
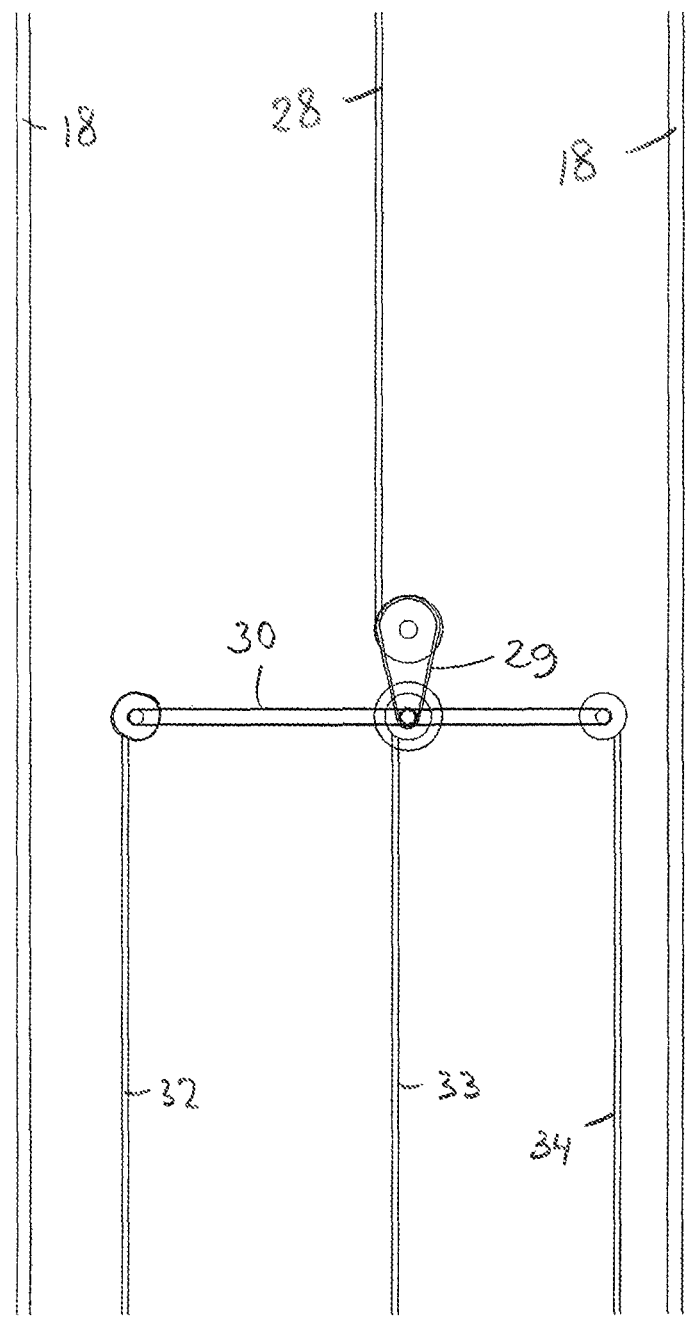
FIG. 8 shows part of FIG. 5 in yet more detail.

This works as follows. If an individual surface wave 10 has reached a float 9, it causes an upward stroke of the float 9. This upward stroke of the float causes the hoist line 28 to be moved upwards, and thereby causes the working liquid 17 to be hoisted upwards within the first liquid guiding structure 52. This upwards hoisting of working liquid 17 is realized by means of butterfly valves, which are part of the structure 31 (for the butterfly valves it is referred to reference numerals 25, 27 in FIGS. 7A and 7B). As a simultaneous consequence of this upward movement of the working liquid 17 within the first liquid guiding structure 52, additional working liquid 17 will be sucked, via the one-way valve structure 43, out of the lower reservoir 3 and into the first liquid guiding structure 52, while at the same time working liquid 17 will be pushed, via the one-way valve structure 42, out of the first liquid guiding structure 52 and into the upper reservoir 2. The result is that the level of the working liquid 17 in the lower reservoir 3 decreases, while the level of the working liquid 17 in the upper reservoir 2 increases. After completion of the upward stroke of the float 9, a downward stroke of the float 9 follows. During this downward stroke, the hoist line 28 is lowered under the action of gravity, which is made possible by the said butterfly valves (Nos. 25, 27 of FIGS. 7A and 7B). During the lowering of the hoist line 28, the one-way valve structures 42 and 43 prevent the working liquid 17 to flow back in said reverse direction. Thus the increased working liquid level of the upper reservoir 2 and the decreased working liquid level of the lower reservoir 3 are maintained during the downward stroke. In summary, the result is that kinetic energy has been extracted from said individual surface wave, and has been converted into increased potential energy of the working fluid.

In the shown example, each hoist line 28 extends through the outside upper wall of the upper reservoir 2, in a vertically moveable manner relative to the outside upper wall. It should be understood that this is realized in a sealing manner, thus preventing that the interior of the upper reservoir would be contaminated by sea water.

In the shown example, the increased potential energy of the working liquid 17, obtained from extracting kinetic energy from a number of surface waves during a number of upward strokes of floats 9, may be converted into electrical energy at any desired time by allowing the working liquid 17 to successively flow, under the action of gravity, out of the upper reservoir 2, through the second liquid guiding structure 44, and into the lower reservoir 3, while generating electrical energy from said flow via the shown turbine 41. Said second liquid guiding structure 44 and said turbine 41 may for example be located in the interior of one or more of the interconnection walls 5 between the upper reservoir 2 and the lower reservoir 3.

It is noted that FIG. 3 furthermore shows an additional fluid guiding structure 45, which interconnects the interiors of the upper reservoir 2 and the lower reservoir 3. By means of this additional fluid guiding structure 45, relative pressures of air in the upper reservoir 2 and air in the lower reservoir 3 can be influenced, which influencing may for example be further controlled by means of controllable valve structure applied to the additional fluid guiding structure 45. Similar to said second liquid guiding structure 44 and said turbine 41, also said additional fluid guiding structure 45 and said controllable valve structure may for example be located in the interior of one or more of the interconnection walls 5 between the upper reservoir 2 and the lower reservoir 3.

As mentioned, FIG. 3 also shows the sensor 7, the calculator 11, and the controller 12. All of these are configured, arranged and effective as specified according to the invention. Reference numerals 14 and 15, used in FIG. 3, schematically indicate the communicative connections between sensor 7 and calculator 11, and between calculator 11 and controller 12, respectively. Reference numeral 16, used in FIG. 3, schematically indicates the communicative connection(s), via which the controlled adjustment of the energy transmission structure of the fluid displacement structure, as specified according to the invention, takes place. All said communicative connections 14, 15, 16 may be realized in many various ways, wired and/or wireless.

As mentioned, FIG. 4 shows, among others, part of one of the vertical walls 4. It is seen from FIG. 4 that this wall 4 has for each float 9 of one row of the float assembly 8 a corresponding hollow compartment lying between vertical separation walls 18. These hollow compartments are extending in vertical direction. In a certain vertical range 53 (indicated in FIG. 4) these compartments have vertically extending cylindrical bores which have been indicated in FIGS. 5 and 6 by reference numerals 19, 20, 21. Note that FIG. 6 is a horizontal cross-section of the vertical wall 4, said horizontal cross-section being present throughout said vertical range 53. Also note that the main construction of the vertical wall 4, including its separation walls 18 may for example be made of concrete. Also the hatched portions in FIG. 6, through which the vertically extending cylindrical bores 19, 20, 21 are extending, may be made of concrete.

In the introduction of the present document it has been described that the fluid displacement structure of a system according to the invention comprises an energy transmission structure and at least one controller. There, it also has been described that this energy transmission structure is controllably adjustable by said at least one controller. It furthermore has been described that in certain embodiments of the invention said adjusting of said energy transmission structure may comprise adjustment of a contact surface configuration of said energy transmission structure, which contact surface configuration contactingly acts upon the working fluid in the reservoir structure. It also has been described that said adjusting of said energy transmission structure may, additionally or alternatively, comprise gear adjustment of a gear structure of said energy transmission structure. In the shown example, the system 1 both has such a controllably adjustable contact surface configuration, and such a controllably adjustable gear structure. This is elucidated next with reference to FIGS. 4 through 9B.

Figure 9A:
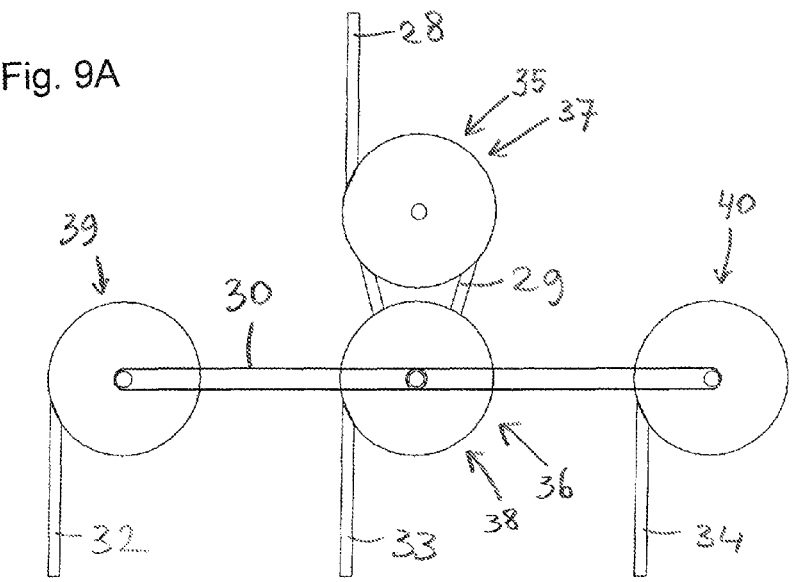
FIG. 9A shows part of FIG. 8 in yet more detail.
Figure 9B:
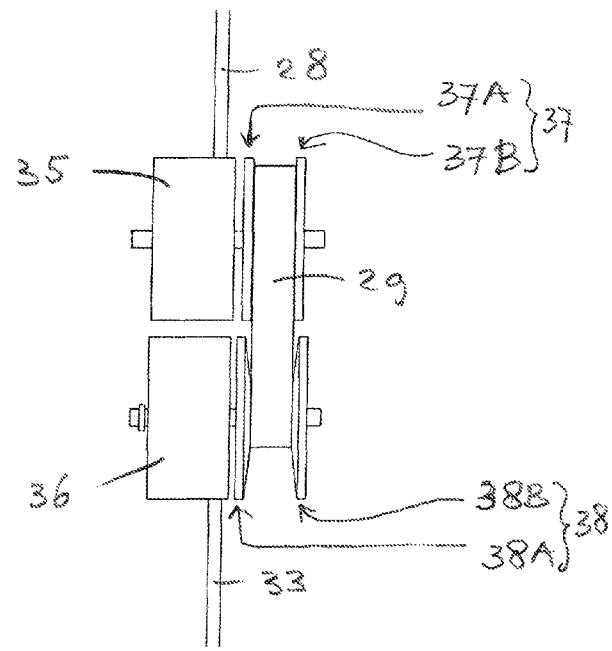
FIG. 9B is a different, side view of the system part shown in FIG. 9A.

In FIGS. 9A and 9B it is seen that the hoist line 28 is connected to a first winch 35, which has a common rotation axis with a first cone pair 37, consisting of the two cones 37A and 37B. The two cones 37A and 37B are controllable by the controller 12 so as to axially move relative to one another. Via a belt 29 the first cone pair 37 is connected to a second cone pair 38, consisting of the two cones 38A and 38B, which also are controllable by the controller 12 so as to axially move relative to one another. The person skilled in the art will readily recognize the construction of the parts 29, 37 and 38 as an example of a type of gear structure, which often is referred to as "continuously variable transmission", or the like. The second cone pair 38 has a common rotation axis with a second winch 36. The last mentioned common rotation axis is connected, via a chain 30, to a third winch 39 and a fourth winch 40. Further hoist lines 32, 33, 34 are connected to the winches 39, 36, 40, respectively.

The locations of all rotation axes of the winches 35, 36, 39, 40 and of the cone pairs 37, 38 are fixed relative to the vertical wall 4. These further hoist lines 32, 33, 34 are furthermore connected to piston-like assemblies 22, 23, 24, respectively, which are moveable, up and down, within the cylindrical bores 19, 20, 21, respectively. For example, the hoist line 32 is connected at location 26 (see FIGS. 7A and 7B) of the piston-like assembly 22, which comprises the butterfly valve 25, 27, as described above. All winches 35, 36, 39, 40 are controllable to either lock or give free its corresponding hoist line 28, 33, 32, 34, respectively. For example, in case the hoist line 28 is being pulled upwards by the float 9, the winch 36 may have been controlled by the controller 12 to lock its corresponding hoist line 33, while the winches 39 and 40 may have been controlled by the controller 12 to give their corresponding hoist lines 32 and 34 free. In that case, during an upward stroke of the float, only the piston-like assembly 23 is moved upwards, while the other two piston-like assemblies 22, 24, under the influence of gravity will not be moved upwards, but remain where they are.

Figure 5:
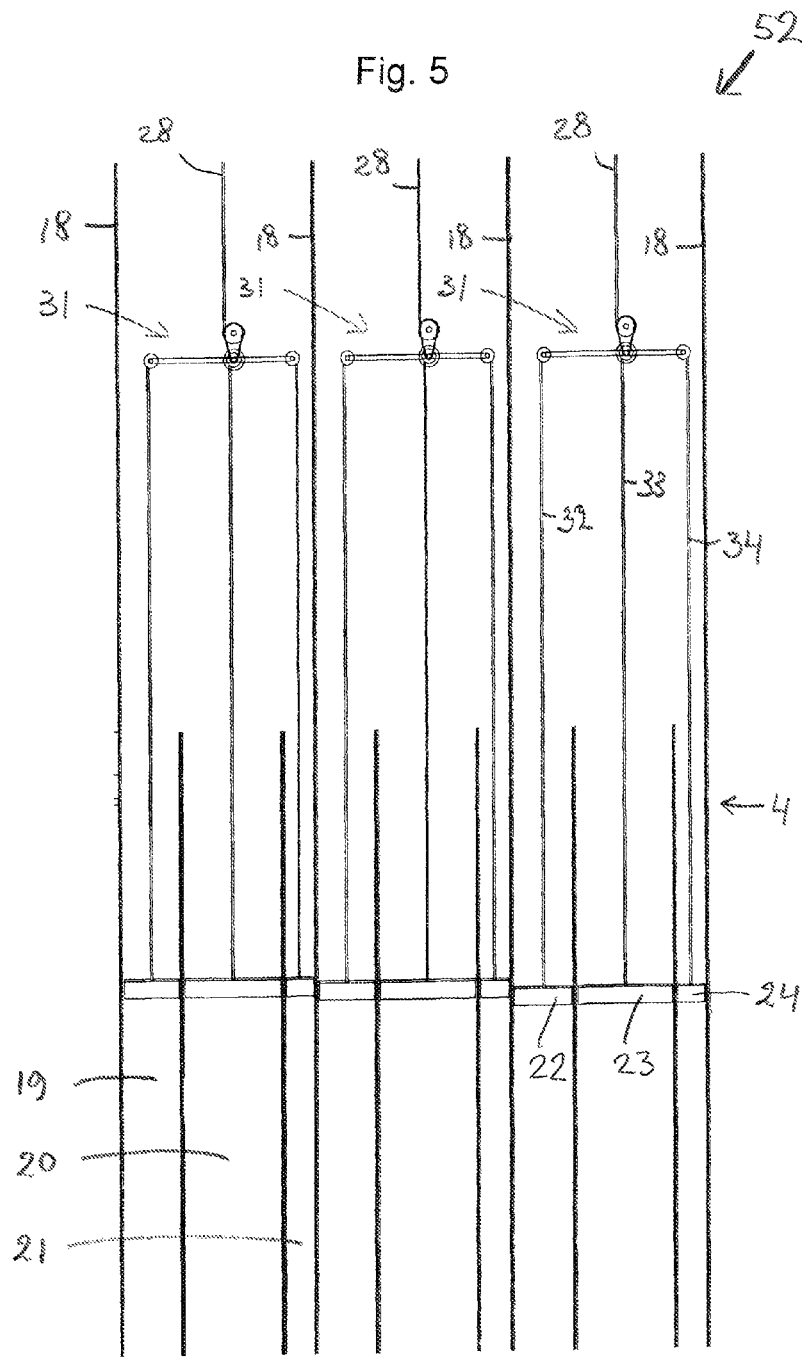
FIG. 5 shows part of FIG. 4 in yet more detail.
Figure 6:
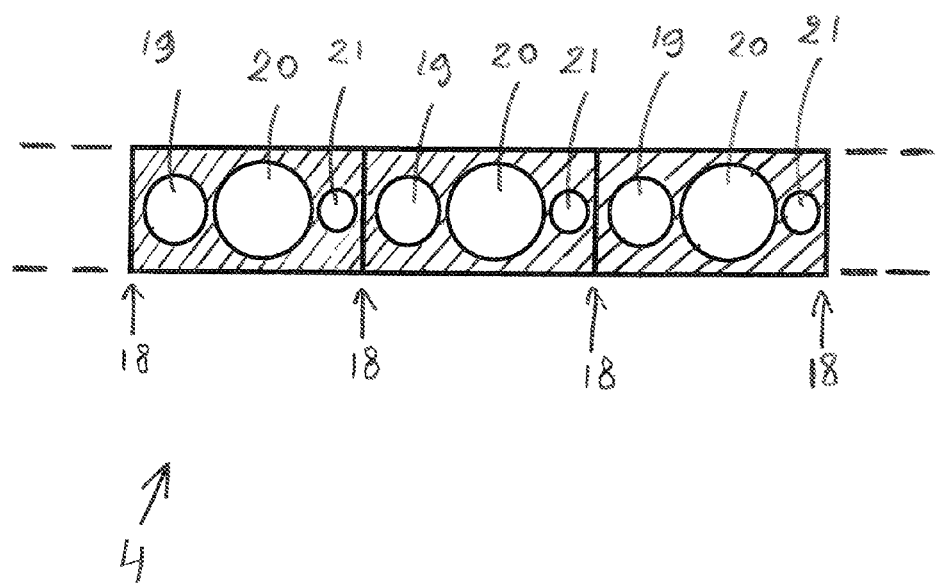
FIG. 6 is a horizontal cross-section of the system part shown in FIG. 5.

As best seen in FIGS. 5 and 6, the piston-like assemblies 22, 23, 24, have different diameters. Thus, by selecting suitable combinations of piston-like assemblies which are to be locked/unlocked, the controller 12 can adjust the contact surface configuration of the energy transmission structure in many ways for each upward stroke of the float, tuned to the predictions calculated by the calculator 11, based on the results from the sensor 7. Similarly, the controller 12 can adjust the transmission ratios of the gear structure 29, 37, 38 in many ways for each upward stroke of the float, tuned to the predictions calculated by the calculator 11, based on the results from the sensor 7.

In the foregoing specification, the invention has been described with reference to a specific example of an embodiment of the invention. However, various modifications and changes may be made therein without departing from the broader scope of the invention as set forth in the appended claims. Just to mention one thing, it is noted that in the shown example a specific gear structure of the "continuously variable transmission" type has been applied. Clearly, various other gear structures may be applied as well. The specifications and drawings are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

The invention claimed is:

1. A method for extracting kinetic energy from surface waves of a water, said waves moving in a horizontal wave movement direction along the water surface of the water, wherein:
    at least one float is kept floating in the area of the surface waves, with partly restricted freedom of floating movements of the float, such that the float is moved by the surface waves at least in reciprocating upward and downward strokes of the float;
    a working fluid is held in a reservoir structure;
    the float is connected to a fluid displacement structure in such manner that for at least one individual surface wave of said surface waves the corresponding upward stroke of the float, which corresponding upward stroke is caused by said individual surface wave having reached the float, moves, via the fluid displacement structure, the working fluid within the reservoir structure in such manner that the potential energy of the working fluid increases, whereby, accordingly, via the float and via the fluid displacement structure, kinetic energy is extracted from said individual surface wave and converted into increased potential energy of the working fluid;
    with the aid of at least one sensor said individual surface wave is detected before said individual surface wave has reached the float;
    with the aid of at least one calculator, and based on said detection, there is calculated a prediction being indicative of the amount of kinetic energy available in said individual surface wave for realizing said conversion into increased potential energy of the working fluid during said corresponding upward stroke of the float; and
    with the aid of at least one controller, and tuned to said calculated prediction being indicative of the amount of the kinetic energy available in said individual surface wave, an energy transmission structure of the fluid displacement structure is adjusted for realizing said conversion into increased potential energy of the working fluid during said corresponding upward stroke of the float;
    and wherein:
    the at least one float comprises at least one further such a float, said further float having its own corresponding further such reciprocating upward and downward strokes and being connected in the said manner to a further such fluid displacement structure having a further such energy transmission structure, wherein the float together with said at least one further float are situated downstream of one another in a float-after-float fashion, thus forming a float-after-float assembly, wherein the term "downstream" is interpreted in the sense of said horizontal wave movement direction of said individual surface wave;
        with the aid of said at least one sensor said individual surface wave is detected before said individual surface wave has reached said further float;
        with the aid of said at least one calculator, and based on said detection before said individual surface wave has reached said further float, there is calculated a further prediction being indicative of the amount of kinetic energy available in said individual surface wave for realizing said conversion into increased potential energy of the working fluid during said corresponding further upward stroke of the further float; and
        with the aid of said at least one controller, and tuned to said calculated further prediction being indicative of the amount of the kinetic energy available in said individual surface wave, said further energy transmission structure of said further fluid displacement structure is adjusted for realizing said conversion into increased potential energy of the working fluid during said corresponding further upward stroke of the further float.

2. A method according to claim 1, wherein said adjusting of said energy transmission structure of said fluid displacement structure for realizing said conversion into increased potential energy of the working fluid during said corresponding upward stroke of the float at least partly takes place during a previous downward stroke of the float, which previous downward stroke, in the sense of said reciprocating upward and downward strokes of the float, directly precedes said corresponding upward stroke of the float.

3. A method according to claim 1, wherein said adjusting of said energy transmission structure of said fluid displacement structure comprises adjustment of a contact surface configuration of said energy transmission structure, which contact surface configuration contactingly acts upon the working fluid in the reservoir structure.

4. A method according to claim 1, wherein said adjusting of said energy transmission structure of said fluid displacement structure comprises gear adjustment of a gear structure of said energy transmission structure.

5. A method according to claim 1, wherein downstreamly adjoining floats of said float-after-float assembly are hingeably interconnected.

6. A method according to claim 1, wherein:
the working fluid is a working liquid;
the reservoir structure comprises an upper reservoir, a lower reservoir and a first liquid guiding structure, the upper reservoir being located in the water at least partly below the water surface of the water and at least partly below the at least one float, the lower reservoir being located in the water at least partly below the water surface of the water and at least partly below the upper reservoir, and the first liquid guiding structure interconnecting the upper reservoir and the lower reservoir; and
the fluid displacement structure comprises a hoist structure and a one-way valve structure;
and wherein the method further comprises:
moving at least part of the working liquid successively out of the lower reservoir, through the first liquid guiding structure, and into the upper reservoir during said corresponding upward stroke of the float, said moving being performed against the action of gravity and under the action of said hoist structure being actuated by the float performing said corresponding upward stroke; and
preventing that during a next corresponding downward stroke of the float, which next corresponding downward stroke of the float, in the sense of said reciprocating upward and downward strokes of the float, directly follows said corresponding upward stroke of the float, at least part of the working liquid under the action of gravity flows back from the upper reservoir, through the first liquid guiding structure, and into the lower reservoir, said preventing being provided by a condition of said one-way valve structure.

7. A method according to claim 6, wherein:
the reservoir structure comprises a second liquid guiding structure, which interconnects the upper reservoir and the lower reservoir;
and wherein the method further comprises:
allowing the working liquid to successively flow, under the action of gravity, out of the upper reservoir, through the second liquid guiding structure, and into the lower reservoir, while generating electrical energy from said flow via at least one turbine.

8. A method for extracting kinetic energy from surface waves of a water, said waves moving in a horizontal wave movement direction along the water surface of the water, wherein:
at least one float is kept floating in the area of the surface waves, with partly restricted freedom of floating movements of the float, such that the float is moved by the surface waves at least in reciprocating upward and downward strokes of the float;
a working fluid is held in a reservoir structure;
the float is connected to a fluid displacement structure in such manner that for at least one individual surface wave of said surface waves the corresponding upward stroke of the float, which corresponding upward stroke is caused by said individual surface wave having reached the float, moves, via the fluid displacement structure, the working fluid within the reservoir structure in such manner that the potential energy of the working fluid increases, whereby, accordingly, via the float and via the fluid displacement structure, kinetic energy is extracted from said individual surface wave and converted into increased potential energy of the working fluid;
with the aid of at least one sensor said individual surface wave is detected before said individual surface wave has reached the float;
with the aid of at least one calculator, and based on said detection, there is calculated a prediction being indicative of the amount of kinetic energy available in said individual surface wave for realizing said conversion into increased potential energy of the working fluid during said corresponding upward stroke of the float; and
with the aid of at least one controller, and tuned to said calculated prediction being indicative of the amount of the kinetic energy available in said individual surface wave, an energy transmission structure of the fluid displacement structure is adjusted for realizing said conversion into increased potential energy of the working fluid during said corresponding upward stroke of the float;
and wherein:
the working fluid is a working liquid;
the reservoir structure comprises an upper reservoir, a lower reservoir and a first liquid guiding structure, the upper reservoir being located in the water at least partly below the water surface of the water and at least partly below the at least one float, the lower reservoir being located in the water at least partly below the water surface of the water and at least partly below the upper reservoir, and the first liquid guiding structure interconnecting the upper reservoir and the lower reservoir; and
the fluid displacement structure comprises a hoist structure and a one-way valve structure;
and wherein the method further comprises:
moving at least part of the working liquid successively out of the lower reservoir, through the first liquid guiding structure, and into the upper reservoir during said corresponding upward stroke of the float, said moving being performed against the action of gravity and under the action of said hoist structure being actuated by the float performing said corresponding upward stroke; and
preventing that during a next corresponding downward stroke of the float, which next corresponding downward stroke of the float, in the sense of said reciprocating upward and downward strokes of the float, directly follows said corresponding upward stroke of the float, at least part of the working liquid under the action of gravity flows back from the upper reservoir, through the first liquid guiding structure, and into the lower reservoir, said preventing being provided by a condition of said one-way valve structure.

9. A method according to claim 8, wherein said adjusting of said energy transmission structure of said fluid displacement structure for realizing said conversion into increased potential energy of the working fluid during said corresponding upward stroke of the float at least partly takes place during a previous downward stroke of the float, which previous downward stroke, in the sense of said reciprocating upward and downward strokes of the float, directly precedes said corresponding upward stroke of the float.

10. A method according to claim 8, wherein said adjusting of said energy transmission structure of said fluid displacement structure comprises adjustment of a contact surface configuration of said energy transmission structure, which contact surface configuration contactingly acts upon the working fluid in the reservoir structure.

11. A method according to claim 8, wherein said adjusting of said energy transmission structure of said fluid displacement structure comprises gear adjustment of a gear structure of said energy transmission structure.

12. A method according to claim 8, wherein:
the at least one float comprises at least one further such a float, said further float having its own corresponding further such reciprocating upward and downward strokes and being connected in the said manner to a further such fluid displacement structure having a further such energy transmission structure, wherein the float together with said at least one further float are situated downstream of one another in a float-after-float fashion, thus forming a float-after-float assembly, wherein the term "downstream" is interpreted in the sense of said horizontal wave movement direction of said individual surface wave;
with the aid of said at least one sensor said individual surface wave is detected before said individual surface wave has reached said further float;
with the aid of said at least one calculator, and based on said detection before said individual surface wave has reached said further float, there is calculated a further prediction being indicative of the amount of kinetic energy available in said individual surface wave for realizing said conversion into increased potential energy of the working fluid during said corresponding further upward stroke of the further float; and
with the aid of said at least one controller, and tuned to said calculated further prediction being indicative of the amount of the kinetic energy available in said individual surface wave, said further energy transmission structure of said further fluid displacement structure is adjusted for realizing said conversion into increased potential energy of the working fluid during said corresponding further upward stroke of the further float.

13. A method according to claim 12, wherein downstreamly adjoining floats of said float-after-float assembly are hingeably interconnected.

14. A method according to claim 8, wherein:
the reservoir structure comprises a second liquid guiding structure, which interconnects the upper reservoir and the lower reservoir;
and wherein the method further comprises:
allowing the working liquid to successively flow, under the action of gravity, out of the upper reservoir, through the second liquid guiding structure, and into the lower reservoir, while generating electrical energy from said flow via at least one turbine.

15. A system for extracting kinetic energy from surface waves of a water, said waves moving in a horizontal wave movement direction along the water surface of the water, the system comprising:
at least one float, which is kept floating in the area of the surface waves, with partly restricted freedom of floating movements of the float, such that the float is moved by the surface waves at least in reciprocating upward and downward strokes of the float;
a reservoir structure for holding a working fluid therein;
a fluid displacement structure, which comprises an energy transmission structure and which is connected to the float in such manner that for at least one individual surface wave of said surface waves the corresponding upward stroke of the float, which corresponding upward stroke is caused by said individual surface wave having reached the float, moves, via the fluid displacement structure, the working fluid within the reservoir structure in such manner that the potential energy of the working fluid increases, whereby, accordingly, via the float and via the fluid displacement structure, kinetic energy is extracted from said individual surface wave and, via said energy transmission structure, converted into increased potential energy of the working fluid;
at least one sensor, configured, arranged and effective to detect said individual surface wave before said individual surface wave has reached the float;
at least one calculator, which is communicatively connected to said at least one sensor and which is configured, arranged and effective to calculate, based on said detection, a prediction being indicative of the amount of kinetic energy available in said individual surface wave for realizing said conversion into increased potential energy of the working fluid during said corresponding upward stroke of the float; and
at least one controller, which is communicatively connected to said at least one calculator and which is configured, arranged and effective to adjust, in a manner tuned to said calculated prediction being indicative of the amount of the kinetic energy available in said individual surface wave, said energy transmission structure for realizing said conversion into increased potential energy of the working fluid during said corresponding upward stroke of the float;
and wherein:
the at least one float comprises at least one further such a float, said further float having its own corresponding further such reciprocating upward and downward strokes and being connected in the said manner to a further such fluid displacement structure having a further such energy transmission structure, wherein the float together with said at least one further float are situated downstream of one another in a float-after-float fashion, thus forming a float-after-float assembly, wherein the term "downstream" is interpreted in the sense of said horizontal wave movement direction of said individual surface wave;
said at least one sensor is configured, arranged and effective to detect said individual surface wave before said individual surface wave has reached said further float;
said at least one calculator is configured, arranged and effective to calculate, based on said detection before said individual surface wave has reached said further float, a further prediction being indicative of the amount of kinetic energy available in said individual surface wave for realizing said conversion into increased potential energy of the working fluid during said corresponding further upward stroke of the further float; and
said at least one controller is configured, arranged and effective to adjust, in a manner tuned to said calculated further prediction being indicative of the amount of the kinetic energy available in said individual surface wave, said further energy transmission structure of said further fluid displacement structure for realizing said conversion into increased potential energy of the working fluid during said corresponding further upward stroke of the further float.

16. A system according to claim 15, wherein said at least one controller is configured, arranged and effective to perform said adjusting of said energy transmission structure of said fluid displacement structure, for realizing said conversion into increased potential energy of the working fluid during said corresponding upward stroke of the float, at least partly during a previous downward stroke of the float, which previous downward stroke, in the sense of said reciprocating upward and downward strokes of the float, directly precedes said corresponding upward stroke of the float.

17. A system according to claim 15, wherein said adjusting of said energy transmission structure of said fluid displacement structure comprises adjustment of a contact surface configuration of said energy transmission structure, which contact surface configuration contactingly acts upon the working fluid in the reservoir structure.

18. A system according to claim 15, wherein said adjusting of said energy transmission structure of said fluid displacement structure comprises gear adjustment of a gear structure of said energy transmission structure.

19. A system according to claim 15, wherein downstreamly adjoining floats of said float-after-float assembly are hingeably interconnected.

20. A system according to claim 15, wherein:
the reservoir structure comprises an upper reservoir, a lower reservoir and a first liquid guiding structure, the upper reservoir being located in the water at least partly below the water surface of the water and at least partly below the at least one float, the lower reservoir being located in the water at least partly below the water surface of the water and at least partly below the upper reservoir, and the first liquid guiding structure interconnecting the upper reservoir and the lower reservoir;
the fluid displacement structure comprises a hoist structure and a one-way valve structure;
the fluid displacement structure is configured, arranged and effective to move, when the working fluid is a working liquid held in the reservoir structure, at least part of the working liquid successively out of the lower reservoir, through the first liquid guiding structure, and into the upper reservoir during said corresponding upward stroke of the float, said moving being performed against the action of gravity and under the action of said hoist structure being actuated by the float performing said corresponding upward stroke; and
the fluid displacement structure is configured, arranged and effective to prevent, when the working fluid is a working liquid held in the reservoir structure, that during a next corresponding downward stroke of the float, which next corresponding downward stroke of the float, in the sense of said reciprocating upward and downward strokes of the float, directly follows said corresponding upward stroke of the float, at least part of the working liquid under the action of gravity flows back from the upper reservoir, through the first liquid guiding structure, and into the lower reservoir, said preventing being provided by a condition of said one-way valve structure.

21. A system according to claim 20, wherein the reservoir structure comprises a second liquid guiding structure, which interconnects the upper reservoir and the lower reservoir, and which allows the working liquid to successively flow, under the action of gravity, out of the upper reservoir, through the second liquid guiding structure, and into the lower reservoir, while generating electrical energy from said flow via at least one turbine.

22. A system for extracting kinetic energy from surface waves of a water, said waves moving in a horizontal wave movement direction along the water surface of the water, the system comprising:
at least one float, which is kept floating in the area of the surface waves, with partly restricted freedom of floating movements of the float, such that the float is moved by the surface waves at least in reciprocating upward and downward strokes of the float;
a reservoir structure for holding a working fluid therein;
a fluid displacement structure, which comprises an energy transmission structure and which is connected to the float in such manner that for at least one individual surface wave of said surface waves the corresponding upward stroke of the float, which corresponding upward stroke is caused by said individual surface wave having reached the float, moves, via the fluid displacement structure, the working fluid within the reservoir structure in such manner that the potential energy of the working fluid increases, whereby, accordingly, via the float and via the fluid displacement structure, kinetic energy is extracted from said individual surface wave and, via said energy transmission structure, converted into increased potential energy of the working fluid;
at least one sensor, configured, arranged and effective to detect said individual surface wave before said individual surface wave has reached the float;
at least one calculator, which is communicatively connected to said at least one sensor and which is configured, arranged and effective to calculate, based on said detection, a prediction being indicative of the amount of kinetic energy available in said individual surface wave for realizing said conversion into increased potential energy of the working fluid during said corresponding upward stroke of the float; and
at least one controller, which is communicatively connected to said at least one calculator and which is configured, arranged and effective to adjust, in a manner tuned to said calculated prediction being indicative of the amount of the kinetic energy available in said individual surface wave, said energy transmission structure for realizing said conversion into increased potential energy of the working fluid during said corresponding upward stroke of the float;
and wherein:
the reservoir structure comprises an upper reservoir, a lower reservoir and a first liquid guiding structure, the upper reservoir being located in the water at least partly below the water surface of the water and at least partly below the at least one float, the lower reservoir being located in the water at least partly below the water surface of the water and at least partly below the upper reservoir, and the first liquid guiding structure interconnecting the upper reservoir and the lower reservoir;
the fluid displacement structure comprises a hoist structure and a one-way valve structure;
the fluid displacement structure is configured, arranged and effective to move, when the working fluid is a working liquid held in the reservoir structure, at least part of the working liquid successively out of the lower reservoir, through the first liquid guiding structure, and into the upper reservoir during said corresponding upward stroke of the float, said moving being performed against the action of gravity and under the action of said hoist structure being actuated by the float performing said corresponding upward stroke; and the fluid displacement structure is configured, arranged and effective to prevent, when the working fluid is a working liquid held in the reservoir structure, that during a next corresponding downward stroke of the float, which next corresponding downward stroke of the float, in the sense of said reciprocating upward and downward strokes of the float, directly follows said corresponding upward stroke of the float, at least part of the working liquid under the action of gravity flows back from the upper reservoir, through the first liquid guiding structure, and into the lower reservoir, said preventing being provided by a condition of said one-way valve structure.

23. A system according to claim 22, wherein said at least one controller is configured, arranged and effective to perform said adjusting of said energy transmission structure of said fluid displacement structure, for realizing said conversion into increased potential energy of the working fluid during said corresponding upward stroke of the float, at least partly during a previous downward stroke of the float, which previous downward stroke, in the sense of said reciprocating upward and downward strokes of the float, directly precedes said corresponding upward stroke of the float.

24. A system according to claim 22, wherein said adjusting of said energy transmission structure of said fluid displacement structure comprises adjustment of a contact surface configuration of said energy transmission structure, which contact surface configuration contactingly acts upon the working fluid in the reservoir structure.

25. A system according to claim 22, wherein said adjusting of said energy transmission structure of said fluid displacement structure comprises gear adjustment of a gear structure of said energy transmission structure.

26. A system according to claim 22, wherein:
the at least one float comprises at least one further such a float, said further float having its own corresponding further such reciprocating upward and downward strokes and being connected in the said manner to a further such fluid displacement structure having a further such energy transmission structure, wherein the float together with said at least one further float are situated downstream of one another in a float-after-float fashion, thus forming a float-after-float assembly, wherein the term "downstream" is interpreted in the sense of said horizontal wave movement direction of said individual surface wave;

said at least one sensor is configured, arranged and effective to detect said individual surface wave before said individual surface wave has reached said further float;

said at least one calculator is configured, arranged and effective to calculate, based on said detection before said individual surface wave has reached said further float, a further prediction being indicative of the amount of kinetic energy available in said individual surface wave for realizing said conversion into increased potential energy of the working fluid during said corresponding further upward stroke of the further float; and said at least one controller is configured, arranged and effective to adjust, in a manner tuned to said calculated further prediction being indicative of the amount of the kinetic energy available in said individual surface wave, said further energy transmission structure of said further fluid displacement structure for realizing said conversion into increased potential energy of the working fluid during said corresponding further upward stroke of the further float.

27. A system according to claim 26, wherein downstreamly adjoining floats of said float-after-float assembly are hingeably interconnected.

28. A system according to claim 22, wherein the reservoir structure comprises a second liquid guiding structure, which interconnects the upper reservoir and the lower reservoir, and which allows the working liquid to successively flow, under the action of gravity, out of the upper reservoir, through the second liquid guiding structure, and into the lower reservoir, while generating electrical energy from said flow via at least one turbine.

* * * * *